(12) United States Patent
Rungta et al.

(10) Patent No.: US 10,545,825 B2
(45) Date of Patent: Jan. 28, 2020

(54) FAULT-TOLERANT ENTERPRISE OBJECT STORAGE SYSTEM FOR SMALL OBJECTS

(71) Applicant: Synamedia Limited, Middlesex (GB)

(72) Inventors: Vandana Shyam Rungta, San Jose, CA (US); Dana Marlow Henriksen, Lindon, UT (US); Mel J. Oyler, Pleasant Grove, UT (US); Kevin Wayne Kingdon, Hayward, CA (US)

(73) Assignee: Synamedia Limited, Middlesex (GB)

( * ) Notice: Subject to any disclaimer, the term of this patent is extended or adjusted under 35 U.S.C. 154(b) by 29 days.

(21) Appl. No.: 15/207,895

(22) Filed: Jul. 12, 2016

(65) Prior Publication Data

US 2017/0315869 A1 Nov. 2, 2017

Related U.S. Application Data

(60) Provisional application No. 62/329,319, filed on Apr. 29, 2016.

(51) Int. Cl.
*G06F 11/10* (2006.01)
*G06F 3/06* (2006.01)

(52) U.S. Cl.
CPC .......... *G06F 11/1096* (2013.01); *G06F 3/064* (2013.01); *G06F 3/067* (2013.01); *G06F 3/0619* (2013.01); *G06F 11/1076* (2013.01)

(58) Field of Classification Search
CPC .......................... G06F 11/1096; G06F 11/1076
See application file for complete search history.

(56) References Cited

U.S. PATENT DOCUMENTS 5,333,305 A * 7/1994 Neufeld ................ G06F 3/0601
714/5.11
5,649,162 A * 7/1997 Klein .................... G06F 13/385
710/305

(Continued)

FOREIGN PATENT DOCUMENTS

EP 2933733 A1 10/2015

OTHER PUBLICATIONS

International Search Report and Written Opinion for corresponding PCT/US2016/069184 dated Jul. 7, 2017.

(Continued)

*Primary Examiner* — Steve N Nguyen
(74) *Attorney, Agent, or Firm* — Fernando & Partners, LLP

(57) ABSTRACT

Various implementations disclosed herein provide fault-tolerant enterprise object storage system that can store small objects. In various implementations, the fault-tolerant enterprise object storage system writes a small object into an aggregate object that is distributed across a plurality of storage entities. In some implementations, the small object is at least an order of magnitude smaller than the aggregate object, and the small object is within the same order of magnitude of a block unit addressable within each of the storage entities. In some implementations, based on the small object, the storage system updates the parity data associated with the aggregate object in response to writing the small object into the aggregate object. In various implementations, the storage system updates a processed data end offset indicator that indicates that the parity data for the aggregate object includes valid data up to and including the small object.

20 Claims, 10 Drawing Sheets

(56) References Cited

U.S. PATENT DOCUMENTS

| | | | | |
|---|---|---|---|---|
| 5,974,503 A * | 10/1999 | Venkatesh | G06F 11/1076 | 348/E5.008 |
| 6,871,317 B1 * | 3/2005 | Corbett | G06F 11/1076 | 714/800 |
| 7,512,862 B1 * | 3/2009 | Taylor | G06F 11/1076 | 702/189 |
| 7,647,451 B1 * | 1/2010 | Corbett | G06F 3/0607 | 711/114 |
| 7,793,146 B1 * | 9/2010 | Gibson | G06F 11/1076 | 711/114 |
| 7,898,757 B2 * | 3/2011 | Park | G11B 20/1217 | 360/39 |
| 7,958,304 B1 * | 6/2011 | Goel | G06F 11/1096 | 711/114 |
| 8,862,818 B1 * | 10/2014 | Ozdemir | G06F 3/0689 | 711/114 |
| 9,766,837 B2 * | 9/2017 | McGlaughlin | G06F 11/1012 | |
| 2002/0170017 A1 * | 11/2002 | Busser | G06F 11/2092 | 714/800 |
| 2003/0188097 A1 * | 10/2003 | Holland | G06F 11/1076 | 711/114 |
| 2004/0049632 A1 * | 3/2004 | Chang | G06F 11/1076 | 711/114 |
| 2005/0066124 A1 * | 3/2005 | Horn | G06F 11/1076 | 711/114 |
| 2007/0240027 A1 * | 10/2007 | Vesma | H03M 13/293 | 714/759 |
| 2008/0222490 A1 * | 9/2008 | Leung | G06F 11/1068 | 714/763 |
| 2009/0204846 A1 * | 8/2009 | Baloun | G06F 11/1076 | 714/6.12 |
| 2011/0072210 A1 * | 3/2011 | Dhuse | G06F 11/1076 | 711/114 |
| 2011/0185268 A1 * | 7/2011 | Matsushige | G06F 11/0727 | 714/819 |
| 2014/0281066 A1 * | 9/2014 | Grube | G06F 3/067 | 710/74 |
| 2014/0324931 A1 * | 10/2014 | Grube | G06F 17/30206 | 707/828 |
| 2015/0339194 A1 * | 11/2015 | Kalos | G06F 11/1076 | 714/6.24 |

OTHER PUBLICATIONS

International Preliminary Report on Patentability for corresponding PCT/US2016/069184 dated Nov. 8, 2087.

* cited by examiner

US 10,545,825 B2

FAULT-TOLERANT ENTERPRISE OBJECT STORAGE SYSTEM FOR SMALL OBJECTS

TECHNICAL FIELD

The present disclosure generally relates to enterprise storage systems, and in particular, to a fault-tolerant enterprise object storage system for small objects.

BACKGROUND

An enterprise storage system ("storage system," hereinafter) typically includes various storage entities provided to store data associated with objects. A storage entity often includes various addressable data blocks. A data block usually refers to the smallest addressable block of memory in a storage entity that stores the data associated with the objects. The average size of a typical object is sometimes an order of magnitude larger than the size of a data block. As such, most previously available storage systems store the object using numerous data blocks across multiple storage entities. Such storage systems are typically inefficient at storing objects that are less than or of the same order of magnitude as the size of a data block.

Some storage systems also provide fault-tolerance. Such storage systems are usually able to recover an object when there is a need to recover the object. For example, previously available storage systems typically recover an object in response to detecting a loss of data at a storage entity that stored data associated with the object. Prior storage systems use parity data for an object to recover the object. The parity data is typically stored in parity blocks across multiple storage entities. A parity block usually refers to the smallest addressable block of memory in a storage entity that stores the parity data. Some previously available storage systems are inefficient at storage space utilization because they use more parity blocks than needed to provide fault tolerance.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
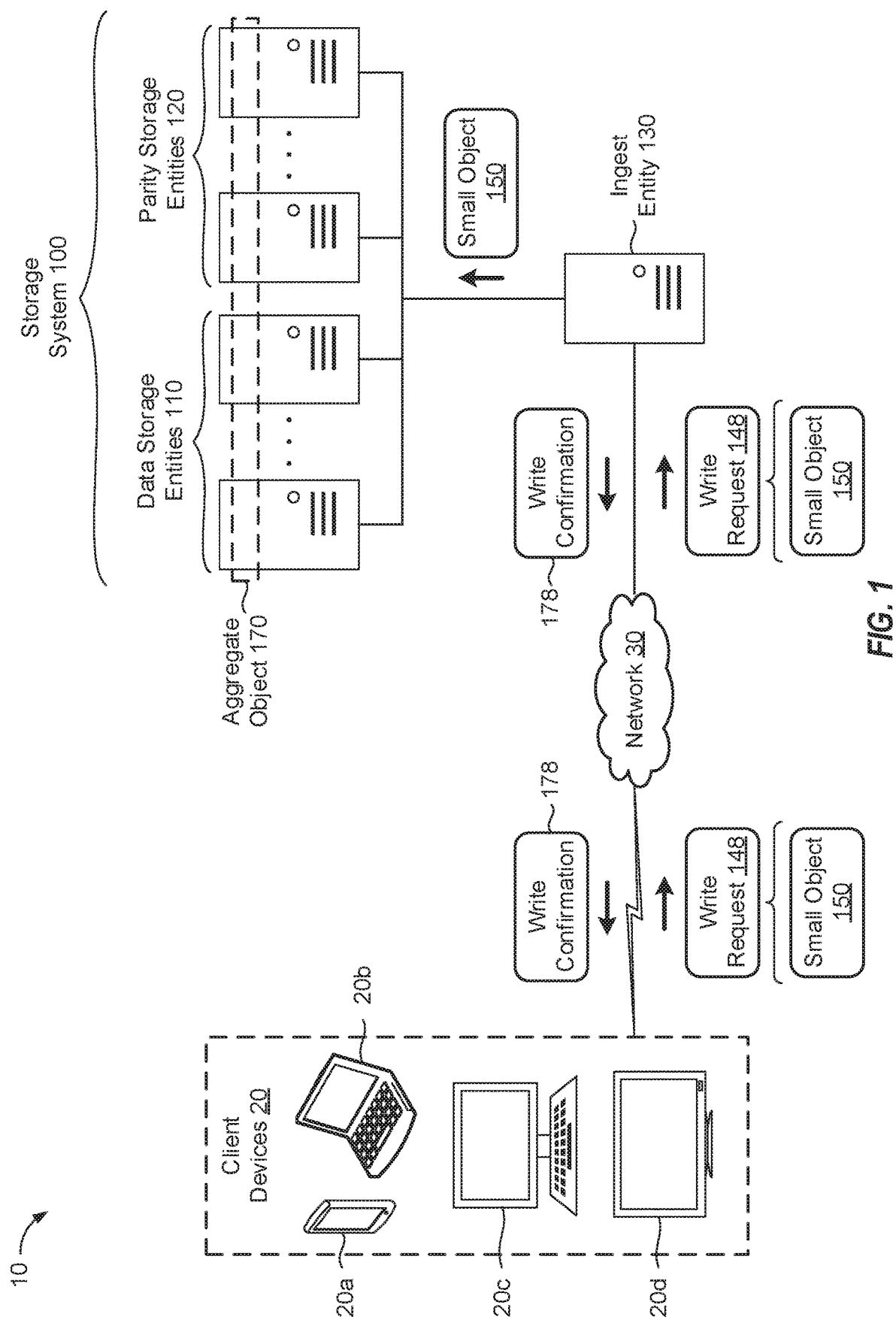
FIG. 1 is a schematic diagram of an enterprise storage system environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Some previously available fault-tolerant enterprise object storage systems (storage system, hereinafter) are configured to store large objects. A large object typically refers to an object that is at least an order of magnitude larger than the smallest addressable block of memory (e.g., allocation unit of data) in the storage system. As such, in some previously available storage systems, the parity data for a small object typically occupies the same amount of space on disk than the size of the small object because of the method of error control coding utilized and reduces the benefits of erasure coding. A small object refers to an object that is typically less than or about the same size as the smallest addressable block of memory in the storage system. Hence, some previously available storage systems are not efficient at storing small objects. Moreover, some previously available storage systems do not synthesize parity data for small objects upon receiving the small objects. Hence, some previously available storage systems are not capable of recovering a small object in the event of a data loss because there is typically no parity data for the small object.

By contrast, various implementations disclosed herein enable writing small objects into a fault-tolerant enterprise object storage system that stores the small objects in a relatively efficient manner and recovers the small objects in the event of a data loss. For example, in various implementations, a method of writing a small object is performed by a fault-tolerant enterprise object storage system that is configured to synthesize parity data in order to protect stored data from loss. Hereinafter, the fault-tolerant enterprise object storage system is referred to as a storage system. In various implementations, the storage system includes a plurality of storage entities that are configured to store data on a block basis. In various implementations, the storage system includes one or more processors. In various implementations, the method includes writing a first object (e.g., a small object) into an aggregate object that is distributed across the plurality of storage entities. In some implementations, a first size of the first object is at least an order of magnitude less than a second size of the aggregate object and within the same order of magnitude of a block unit addressable within each of the storage entities. In various implementations, the method includes updating, based on the first object, parity data associated with the aggregate object in response to writing the first object into the aggregate object. The parity information is stored at one or more parity storage entities. In various implementations, the method also includes updating a processed data end offset indicator that indicates that the parity data for the aggregate object includes valid data up to and including the first object.

FIG. 1 is a block diagram of a storage system environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the storage system environment 10 includes one or more client devices 20, a network 30 (e.g., a public/external network such as the Internet), and a fault-tolerant enterprise object storage system 100 (storage system 100, hereinafter).

In operation, the storage system 100 is utilized to store various objects. In some implementations, an object refers to any data asset. In some implementations, an object includes a data asset that is presentable to a user via the client device 20. For example, the object includes a video file that represents a movie, an audio file that represents a song, a text file, etc. More generally, in various implementations, the object includes a file of any file type (e.g., .mov, .wma, .mp4, .avi, .mp3, .jpg, .txt, .doc, .docx, .xls, .ppt, etc.) In some implementations, an object includes a data asset that represents a set of computer-readable instructions that are executable at the client device 20. For example, in some implementations, the object includes a native application that is downloaded and installed at the client device 20, a browser plugin, etc.

In various implementations, the storage system 100 includes one or more data storage entities 110, one or more parity storage entities 120, and an ingest entity 130. The data storage entities 110 store data associated with the objects. Hereinafter, the data associated with an object is referred to as object data. In some implementations, a data storage entity 110 includes one or more computer readable storage mediums. For example, the data storage entity 110 includes solid state memory devices, hard disk memory devices, optical disk drives, read-only memory and/or nanotube-based storage devices. In some implementations, the data storage entities 110 includes data servers that execute computer-readable instructions. In various implementations, a data storage entity 110 includes various data blocks (not shown) for storing object data. As described herein, in various implementations, a data block refers to the smallest addressable block of memory (e.g., the smallest allocation unit of data) in a data storage entity 110. In some implementations, the data blocks are identically-sized (e.g., 2 MB each).

In various implementations, the parity storage entities 120 store parity data associated with the objects. In some implementations, the storage system 100 synthesizes parity data for an object, and stores the parity data in the parity storage entities 120. The storage system 100 utilizes any suitable technique for synthesizing the parity data. In various implementations, the storage system 100 utilizes the parity data for an object to recover the object in the event of a data loss at a data storage entity 110. In some implementations, recovering an object refers to rebuilding, reconstructing, restoring, and/or repairing the object. For example, if a data storage entity 110 that stores a portion of the object data crashes, then the storage system 100 utilizes the parity data to recover the object. The storage system 100 utilizes any suitable technique for recovering the object. Similar to the data storage entities 110, in some implementations, the parity storage entities 120 include one or more computer readable mediums for storing the parity data. In various implementations, a parity storage entity 120 includes various parity blocks (not shown) for storing parity data. In some implementations, a parity block refers to the smallest addressable block of memory (e.g., the smallest allocation unit of data) in a parity storage entity 120. In some implementations, the parity blocks are identically-sized (e.g., 2 MB each).

In various implementations, the ingest entity 130 serves as an interface for the storage system 100. The ingest entity 130 receives/transmits data from/to any device that is external to the storage system 100. Specifically, the ingest entity 130 receives/transmits data from/to the client devices 20. In various implementations, receiving/transmitting data includes receiving/transmitting the objects. Alternatively or additionally, receiving/transmitting data includes receiving/transmitting instructions. In some implementations, the instructions include operations that are performed in relation to the objects. Example instructions include writing an object, reading an object, deleting an object, copying an object, etc. In some implementations, the ingest entity 130 includes hardware and/or software that enables the ingest entity 130 to perform its functionality. In some examples, the ingest entity 130 is implemented by a server system (e.g., as described in FIG. 8).

In various implementations, the storage system 100 utilizes various techniques associated with distributed erasure coding. In some implementations, the storage system 100 distributes an object across multiple (e.g., all) data storage entities 110. For example, the storage system 100 stores the first 2 MB of the object data at one data storage entity 110, the next 2 MB of the object data at another data storage entity 110, etc. In some implementations, the storage system 100 distributes the object across multiple data storage entities 110 even if the object is small enough to be stored at a single data storage entity 110. Distributing the object data across multiple data storage entities 110 reduces the risk of losing object data for the entire object. Similarly, in some implementations, the storage system 100 distributes the parity data for an object across multiple (e.g., all) parity storage entities 120.

In some implementations, the storage system 100 (e.g., the ingest entity 130) receives a write request 148 from the client device 20. The write request 148 includes a request to write (e.g., store) a small object 150 into the storage system 100. In some implementations, the write request 148 includes the small object 150. Alternatively or additionally, the write request 148 includes an object identifier (e.g., a Uniform Resource Identifier (URI)) and/or a link (e.g., a Uniform Resource Locator (URL)) that the storage system 100 utilizes to fetch the small object 150. In some implementations, a small object 150 refers to an object that is smaller than or about the same size as the data blocks and/or the parity blocks. In other words, in some implementations, a small object 150 refers to an object that is less than, or of the same order of magnitude as the data block and/or the parity block.

In various implementations, the ingest entity 130 writes the small object 150 into an aggregate object 170 that is stored across multiple data storage entities 110. In some implementations, the aggregate object 170 refers to a relatively large object that occupies a set of data blocks across multiple data storage entities 110. In such implementations, the ingest entity 130 writes the small object 150 into the aggregate object 170 by writing the object data for the small object 150 into one or more of the data blocks that the aggregate object 170 occupies. In some implementations, the aggregate object 170 refers to a collection of objects. In such implementations, the ingest entity 130 writes the small object 150 to the aggregate object 170 by including the small object 150 in the collection. In various implementations, the aggregate object 170 is at least an order of magnitude larger than the small object 150.

In various implementations, the ingest entity 130 synthesizes parity data for the small object 150. The ingest entity 130 utilizes any suitable technique to synthesize the parity data. In some implementations, the aggregate object 170 is associated with parity data that occupies a set of parity blocks in the parity storage entities 120. In such implementations, the ingest entity 130 writes the parity data for the small object 150 into one or more of the parity blocks associated with the aggregate object 170. In some implementations, the ingest entity 130 updates a processed data end offset indicator (not shown) to indicate that the parity data for the aggregate object 170 includes valid data up to and including the small object 150. In other words, in some implementations, after storing the parity data for the small object 150, the ingest entity 130 updates the processed data end offset indicator to indicate that the parity data is usable to recover the small object 150.

In some implementations, the storage system 100 sends (e.g., transmits) a write confirmation 178 (e.g., a message) to the client device 20. In some implementations, the write confirmation 178 acknowledges the request to store the small object 150. In some implementations, the write confirmation 178 indicates that the small object 150 has been stored in the storage system 100. Additionally or alternatively, the write confirmation 178 indicates that parity data for the small object 150 has been synthesized and stored in the storage system 100. In some examples, the write confirmation 178 indicates that the small object 150 is fault-tolerant.

In various implementations, the client devices 20 include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device 20 (e.g., a mobile computing device 20a, a laptop computer 20b, a desktop computer 20c, a television 20d, etc.) includes one or more processors, one or more types of memory, a display and/or other user interface components such as a keyboard, a touch screen display, a mouse, a track-pad, a digital camera and/or any number of supplemental devices to add functionality. In some implementations, a client device 20 includes a suitable combination of hardware, software and firmware configured to provide at least some of protocol processing, modulation, demodulation, data buffering, power control, routing, switching, clock recovery, amplification, decoding, and error control.

Figure 2:
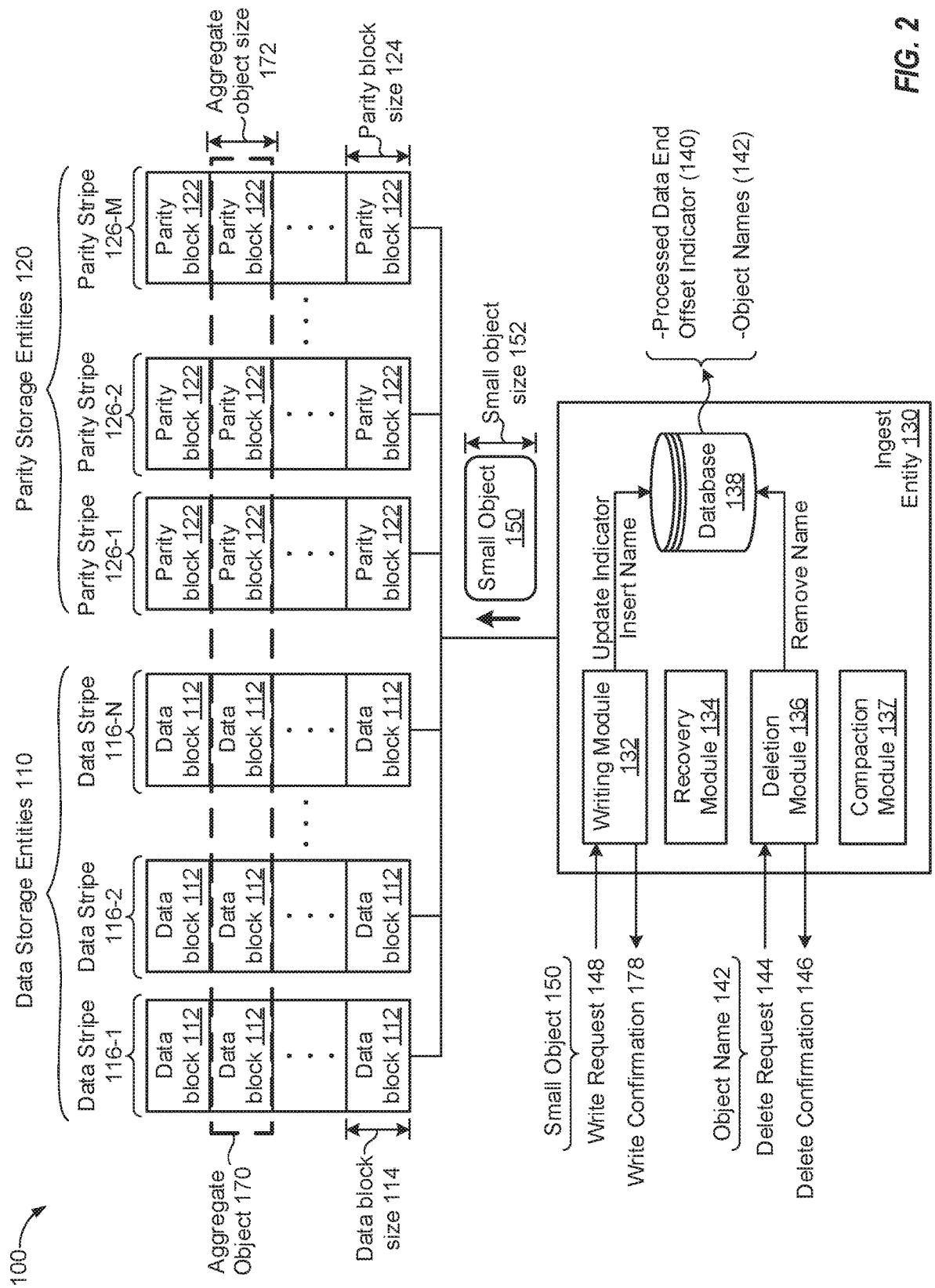
FIG. 2 is a block diagram of an enterprise storage system in accordance with some implementations.

FIG. 2 is a block diagram of the storage system 100 in accordance with some implementations. As exemplified, in various implementations, the data storage entity 110 includes various data blocks 112. In some implementations, a data block 112 refers to the smallest addressable block of memory (e.g., the smallest allocation unit of data) in the data storage entity 110. A data block 112 is associated with a data block size 114. In some implementations, the data block size 114 is a constant (e.g., a runtime constant). In some examples, the data block size 114 is adjustable by an operator of the storage system 100. In some scenarios, the data block size 114 is several megabytes (e.g., 2 MB). A collection of data blocks 112 at a particular data storage entity 110 is referred to as a data stripe (e.g., data stripe 116-1, data stripe 116-2 . . . data stripe 116-N).

In various implementations, the parity storage entity 120 includes various parity blocks 122. In some implementations, a parity block 122 refers to the smallest addressable block of memory (e.g., the smallest allocation unit of data) in the parity storage entity 120. A parity block 122 is associated with a parity block size 124. In some implementations, the parity block size 124 is a constant (e.g., a runtime constant). In some examples, the parity block size 124 is adjustable by an operator of the storage system 100. In some scenarios, the parity block size 124 is several megabytes (e.g., 2 MB). As exemplified in FIG. 2, in various implementations, the parity block size 124 is equal to the data block size 114. However, in some implementations, the parity block size 124 is different from the data block size 114. A collection of parity blocks 122 at a particular parity storage entity 120 is referred to as a parity stripe (e.g., parity stripe 126-1, parity stripe 126-2 . . . parity stripe 126-M).

The aggregate object 170 is associated with an aggregate object size 172. In various implementations, the aggregate object size 172 is at least an order of magnitude larger than the data block size 114 and/or the parity block size 124. For example, in some implementations, if the data block size 114 and the parity block size 124 is several megabytes, then the aggregate object size 172 is several gigabytes (e.g., more than 1 GB). As illustrated in FIG. 2, in various implementations, the aggregate object 170 is distributed across multiple data storage entities 110. Similarly, in various implementations, the parity data for the aggregate object 170 is distributed across multiple parity storage entities 120. In such implementations, each parity storage entity 120 stores different parity data for the aggregate object 170 to provide an additional level of resiliency.

In various implementations, the ingest entity 130 includes a writing module 132, a recovery module 134, a deletion module 136, a compaction module 137, and a database 138. In various implementations, the writing module 132, the recovery module 134, the deletion module 136, and/or the compaction module 137 are implemented in hardware (e.g., as one or more application specific integrated circuits (ASICs)) and/or in software (e.g., as one or more sets of computer readable instructions that are executed by one or more central processing units). In various implementations, the database 138 stores a processed data end offset indicator 140. In some implementations, the processed data end offset indicator 140 is an indicator that indicates what the parity blocks 122 associated with the aggregate object 170 represent. Additionally or alternatively, the processed data end offset indicator 140 indicates the amount of valid data in a partially utilized data block 112. In some implementations, the processed data end offset indicator 140 includes a value that indicates whether the parity data associated with the aggregate object 170 includes valid data for the small object 150. In other words, in some implementations, the processed data end offset indicator 140 indicates whether the ingest entity 130 can recover the small object 150 based on the parity data. In various implementations, the database 138 stores object names 142 for the objects that are stored in the data storage entities 110.

In various implementations, the writing module 132 writes the small object 150 into the aggregate object 170. In some implementations, the writing module 132 receives a write request 148 to store the small object 150. Upon receiving the write request 148, the writing module 132 writes the small object 150 into the aggregate object 170. In some implementations, the write request 148 includes the small object 150. In such implementations, the writing module 132 retrieves the small object 150 from the write request 148. In some implementations, the write request 148 includes an object identifier (ID) (e.g., a URI) that identifies the small object 150, or a link (e.g., a URL) for the small object 150. In such implementations, the writing module 132 utilizes the object ID or the link to obtain the small object 150.

In various implementations, the writing module 132 writes the small object 150 into the aggregate object 170 by writing the object data for the small object 150 into the data blocks 112 associated with the aggregate object 170. In some implementations, the writing module 132 synthesizes parity data for the small object 150. The writing module 132 utilizes any suitable technique for synthesizing the parity data for the small object 150. In some implementations, the writing module 132 writes the parity data for the small object 150 into the parity blocks 122 associated with the aggregate object 170.

In various implementations, the writing module 132 updates the processed data end offset indicator 140 to indicate that the parity data for the aggregate object 170 includes valid data for the small object 150. In various implementations, the writing module 132 determines a small object size 152 for the small object 150. In some implementations, the writing module 132 determines the small object size 152 based on metadata associated with the small object 150. In some implementations, the writing module 132 updates the processed data end offset indicator 140 by incrementing a value of the processed data end offset indicator 140 by the small object size 152. Additionally or alternatively, the writing module 132 inserts (e.g., writes) an object name 142 for the small object 150 into the database 138, for example, in order to keep track of the objects that have been written into the aggregate object 170.

In some implementations, the writing module 132 sends a write confirmation 178 upon writing the small object 150 into the aggregate object 170. The write confirmation 178 indicates that the small object 150 has been written into the aggregate object 170. Additionally or alternatively, the write confirmation 178 indicates that the small object 150 is fault-tolerant. In other words, in some implementations, the write confirmation 178 indicates that the small object 150 is recoverable in the event of a data loss at one of the data storage entities 110 that stores a portion of the small object 150.

In various implementations, the recovery module 134 recovers the small object 150 in the event of a data loss at one of the data storage entities 110 that stored a portion of the small object 150. In some implementations, the recovery module 134 detects that a portion of the object data for the small object 150 has been lost, for example, due to a loss of data event at one of the data storage entities 110. Example events that result in a loss of data include power outages, disk failures, data corruption, etc. Upon detecting that a portion of the small object 150 has been lost, the recovery module 134 determines whether the small object 150 is recoverable based on the parity data associated with the aggregate object 170. For example, in some implementations, the recovery module 134 determines whether the processed data end offset indicator 140 indicates that the parity data associated with the aggregate object 170 includes valid data for the small object 150.

In some implementations, the recovery module 134 utilizes the parity data to recover the small object 150, if a value of the processed data end offset indicator 140 is equal to the sum of object sizes for various objects (e.g., all objects) that have been written into the aggregate object 170. In such implementations, the recovery module 134 accesses the database 138 to identify objects (e.g., all objects) that have been written into the aggregate object 170. Upon identifying the objects, the recovery module 134 determines the object size for each object that has been written into the aggregate object 170. Thereafter, the recovery module 134 computes a sum by adding the object sizes (e.g., all object sizes). If the value of the processed data end offset indicator 140 is equal to the sum, then the recovery module 134 determines that the parity data associated with the aggregate object 170 includes valid data for the small object 150. Therefore, the recovery module 134 is able to recover the small object 150 based on the parity data. The recovery module 134 utilizes any suitable technique to recover the small object 150 from the parity data. In some implementations, the aggregate object size 172 represents the sum of object sizes for all objects that have been written into the aggregate object 170. In such implementations, the recovery module 134 uses the parity data to recover the small object 150, if the value of the processed data end offset indicator 140 is equal to the aggregate object size 172.

In various implementations, the deletion module 136 deletes an object from the aggregate object 170. In some implementations, the deletion module 136 deletes an object in response to receiving a delete request 144 to delete the object. For example, sometime after writing the small object 150 into the aggregate object 170, the ingest entity 130 may receive the delete request 144 to delete the small object 150. In some implementations, the delete request 144 includes an object name 142 for an object that is to be deleted. In some implementations, the deletion module 136 removes the object name 142 specified in the delete request 144 from the database 138. In various implementations, when the object name 142 for an object is removed from the database 138, the object is no longer accessible by a device external to the storage system 100. In addition to deleting the object name 142 from the database 138, in various implementations, the deletion module 136 marks the data blocks 112 associated with the corresponding object as invalid. In some implementations, the deletion module 136 sends a delete confirmation 146 that indicates that the object has been deleted.

In various implementations, the compaction module 137 compacts the aggregate object 170. In some implementations, the compaction module 137 determines to compact the aggregate object 170 when the aggregate object 170 appears sparse. For example, in some implementations, the compaction module 137 compacts the aggregate object 170 when the number or percentage of data blocks 112 that are marked as invalid exceeds a threshold (e.g., 25-50%). In some implementations, the compaction module 137 compacts the aggregate object 170 by instantiating a new aggregate object, and migrating the valid data blocks from the aggregate object 170 to the new aggregate object. The valid data blocks refer to data blocks 112 that store object data for an object that is listed in the database 138. By contrast, invalid data blocks refer to the data blocks 112 that store data for an object that is not listed in the database 138 because its corresponding object name 142 has been removed from the database 138.

Figure 3A:
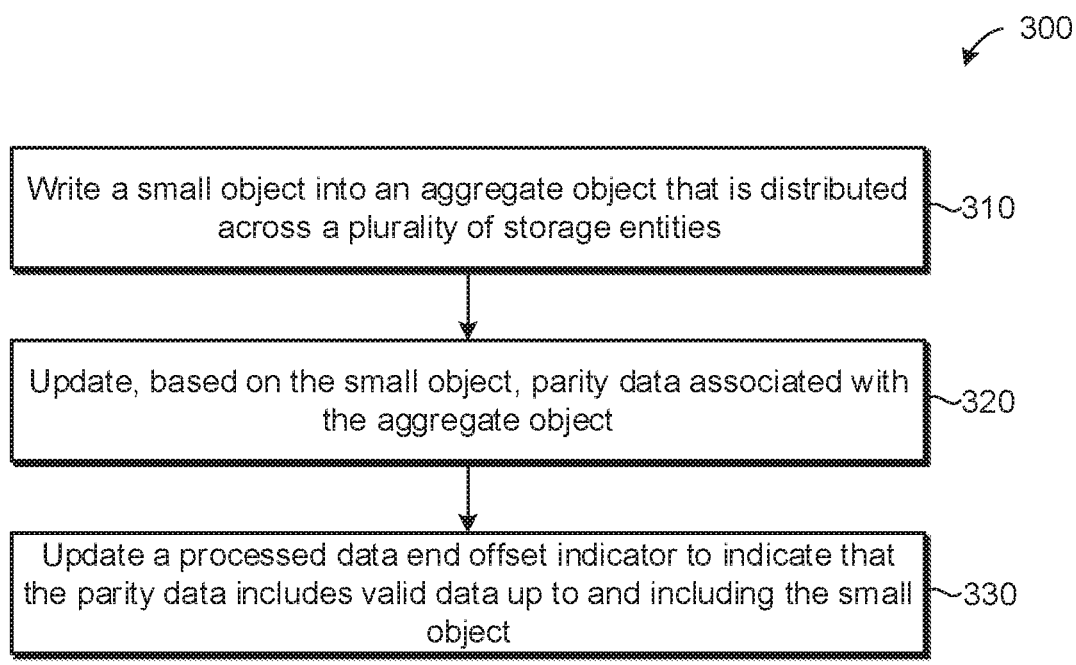
FIG. 3A is a flowchart representation of a method of writing small objects in the enterprise storage system in accordance with some implementations.

FIG. 3A is a flowchart representation of a method 300 of writing small objects in a storage system. In various implementations, the method 300 is implemented as a set of computer readable instructions that are executed at the storage system. For example, in various implementations, the method 300 is performed by the writing module 132 shown in FIG. 2. Briefly, the method 300 includes writing a small object into an aggregate object (at block 310), updating parity data of the aggregate object based on the small object (at block 320), and updating a processed data end offset indicator to indicate that the parity data for the aggregate object includes valid data for the small object (at block 330).

As represented by block 310, in various implementations, the method 300 includes writing a small object into an aggregate object that is distributed across multiple data storage entities. In various implementations, the small object refers to an object that is at least an order of magnitude smaller than the aggregate object. In some implementations, a small object size is within the same order of magnitude of a block unit (e.g., a data block) addressable within each of the storage entities. By contrast, the aggregate object is at least an order of magnitude larger than a data block. In various implementations, writing the small object includes writing object data that is associated with the small object into data blocks that have been assigned to the aggregate object. In some implementations, the method 300 utilizes techniques associated with distributed erasure coding to write the small object into the aggregate object (e.g., as described in relation to FIG. 1).

As represented by block 320, in various implementations, the method 300 includes updating the parity data associated with the aggregate object based on the small object. In various implementations, the method 300 includes synthesizing parity data for the small object. The method 300 utilizes any suitable technique for synthesizing the parity data for the small object. Upon synthesizing the parity data for the small object, in various implementations, the method 300 includes writing the parity data for the small object into parity blocks that are associated with the aggregate object. More generally, the method 300 includes updating, based on the small object, parity data associated with the aggregate object in response to writing the small object into the aggregate object. In various implementations, the parity data is stored at one or more parity storage entities.

As represented by block 330, in various implementations, the method 300 includes updating a processed data end offset indicator to indicate that the parity data for the aggregate object includes valid data up to and including the small object. In some implementations, the method 300 updates the processed data end offset indicator by incrementing a value of the processed data end offset indicator. Moreover, in some implementations, incrementing the value of the processed data end offset indicator includes increasing its value by the size of the small object.

Figure 3B:
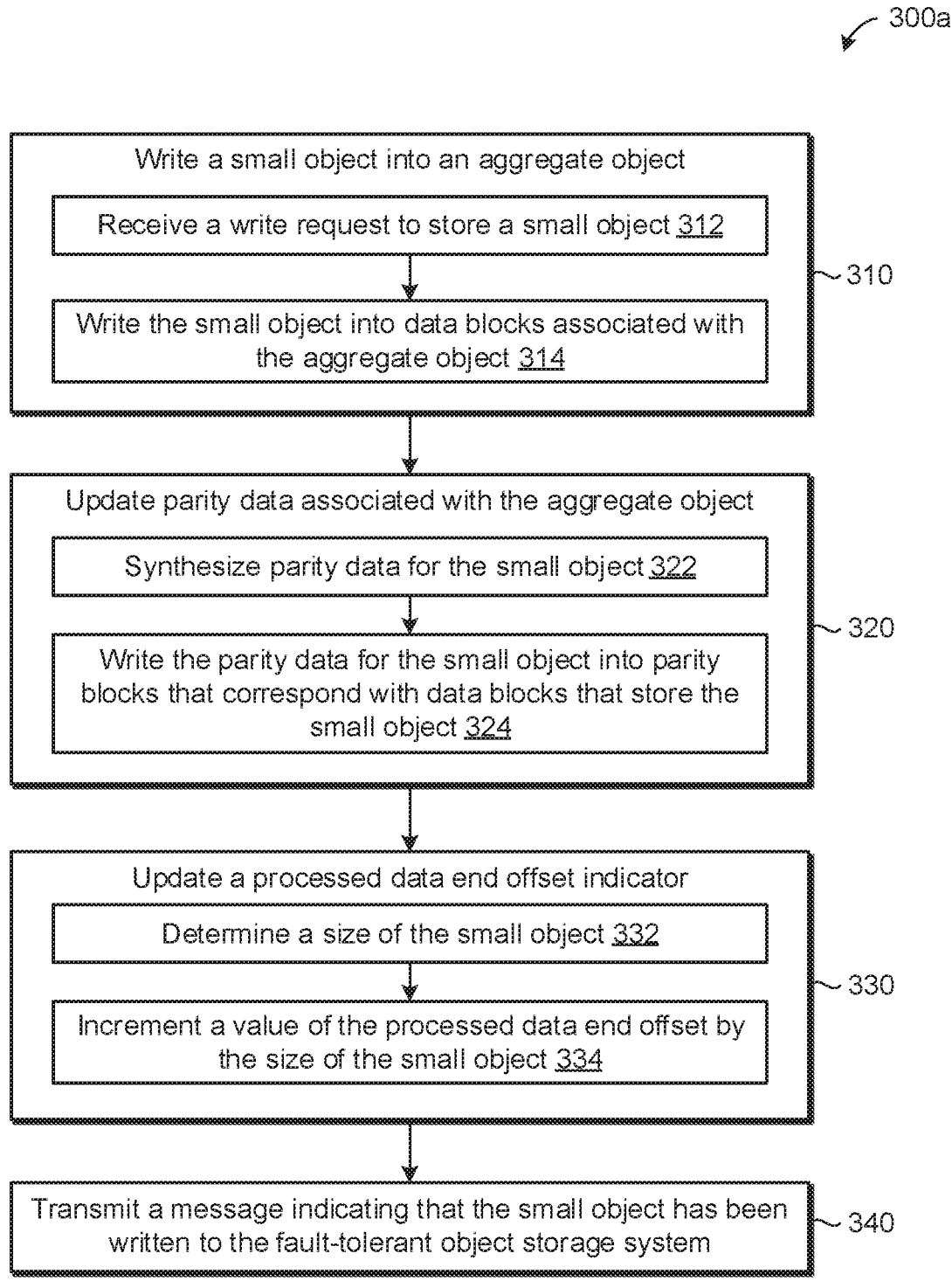
FIG. 3B is a flowchart representation of another method of writing small objects in the enterprise storage system in accordance with some implementations.

FIG. 3B is a flowchart representation of a method 300a of writing small objects in a storage system. In various implementations, the method 300a is implemented as a set of computer readable instructions that are executed at the storage system. For example, in various implementations, the method 300a is performed by the writing module 132 shown in FIG. 2. Briefly, the method 300a includes writing a small object into an aggregate object (at block 310), updating parity data of the aggregate object based on the small object (at block 320), updating a processed data end offset indicator (at block 330), and transmitting a message indicating that the small object has been written into the storage system (at block 340).

As represented by block 310, in various implementations, the method 300a includes receiving a write request (at block 312). In various implementations, the method 300a includes receiving the write request from a client device (e.g., the client device 20 shown in FIG. 1). In some implementations, the write request includes the small object that is to be stored in the storage system. In such implementations, the method 300a includes retrieving the small object from the request. In some implementations, the write request specifies an object ID for the small object, or a link for the small object. In such implementations, the method 300a includes utilizing the object ID or the link to fetch the small object. As represented by block 314, in various implementations, the method 300a includes writing object data associated with the small object into data blocks associated with the aggregate object.

As represented by block 320, in various implementations, the method 300a includes updating parity data associated with the aggregate object based on the small object. In various implementations, the method 300a includes synthesizing the parity data for the small object (at block 322). The method 300a utilizes any suitable technique for synthesizing the parity data for the small object. As represented by block 324, in various implementations, the method 300a includes writing the parity data for the small object into parity blocks. The parity blocks correspond with data blocks that store object data for the small object.

As represented by block 330, in various implementations, the method 300a includes updating a processed data end offset indicator. In various implementations, the method 300a includes determining a size of the small object (at block 332). In various implementations, the method 300a includes determining the size of the small object based on metadata associated with the small object. In various implementations, the method 300a includes updating the processed data end offset indicator by incrementing its value with the size of the small object (at block 334). The updated processed data end offset indicator indicates that the parity data for the aggregate object includes valid data for the small object. In other words, the updated processed data end offset indicator indicates that the parity data for the aggregate object is usable to recover the small object in the event of a data loss at the data blocks that store object data for the small object. In some implementations, upon being updated, the value of the processed data end offset indicator is equal to the size of the aggregate object.

As represented by block 340, in some implementations, the method 300a includes transmitting a message (e.g., the write confirmation 178 shown in FIGS. 1 and 2). In some implementations, the message represents a write confirmation that indicates that the small object has been written into the storage system. Additionally or alternatively, the message indicates that the small object is fault tolerant. In other words, the message indicates that the small object is recoverable in the event of a data loss. In various implementations, the method 300a includes transmitting the message to the same client device from which the method 300a received the write request at block 312.

In some implementations, the method 300a includes determining whether a size of the small object is greater than a threshold size. In such implementations, if the size of the small object is greater than the threshold size, the method 300a includes updating the parity data in response to determining that the size of the small object is greater than the threshold size (as represented by blocks 320 and 330, respectively). However, in some implementations, if the size of the small object is less than the threshold size, the method 300a includes waiting for a predetermined amount of time to update the parity data and the processed data end offset indicator. In some implementations, the method 300a includes updating the parity data and the processed data end offset indicator before the predetermined amount of time expires, if an additional small object is to be written into the aggregate object and the total object size is greater than the threshold size. In these implementations, the total object size represents a sum of both small object sizes. In some implementations, the method 300a includes updating the parity data while the small object is being written into the aggregate object, and updating the parity data after the small object has been written into the aggregate object.

Figure 4A:
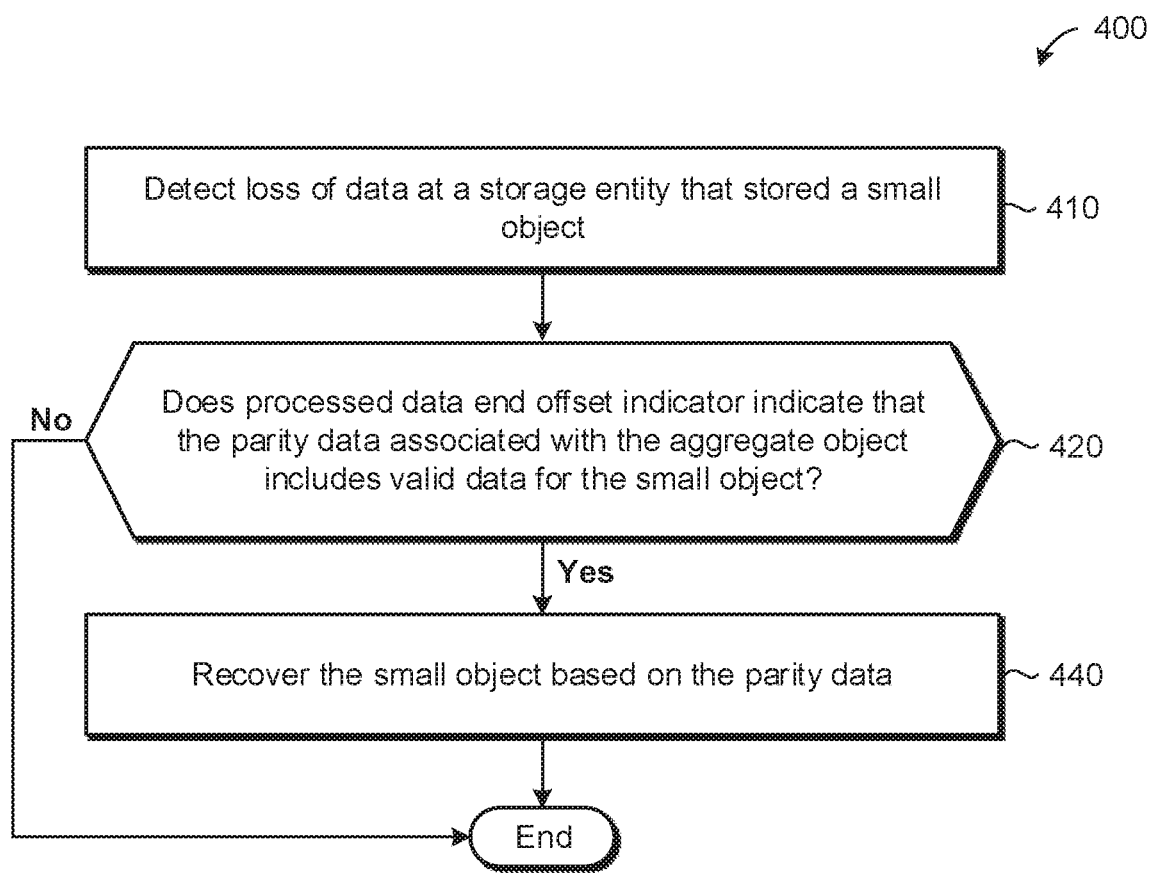
FIG. 4A is a flowchart representation of a method of recovering small objects upon detecting a loss of data at a storage entity in accordance with some implementations.

FIG. 4A is a flowchart representation of a method 400 of recovering small objects upon detecting a loss of data at a storage entity in accordance with some implementations. In various implementations, the method 400 is implemented as a set of computer readable instructions that are executable at the storage system. For example, in various implementations, the method 400 is performed by the recovery module 134 shown in FIG. 2. Briefly, the method 400 includes detecting loss of data at a data storage entity that stored a small object (at block 410), determining whether a processed data end offset indicator indicates that the parity data associated with an aggregate object includes valid data for the small object (at block 420), and recovering the small object based on the parity data (at block 440).

As represented by block 410, in various implementations, the method 400 includes detecting a loss of data at a data storage entity that stored a small object within an aggregate object. In some implementations, the loss of data results in at least a portion of the object data for the small object being lost. The loss of data occurs due to a variety of reasons (e.g., loss of power, disk failure, server crashing, etc.).

As represented by block 420, in various implementations, the method 400 includes determining whether a processed data end offset indicator indicates that the parity data associated with the aggregate object includes valid data for the small object. In other words, in various implementations, the method 400 includes determining whether the parity data for the aggregate object includes parity data for the small object. Put another way, in various implementations, the method 400 includes determining whether the parity data is usable for properly recovering the small object. In some implementations, the method 400 performs the operations exemplified in FIG. 4B at block 420. If the processed data end offset indicator indicates that the parity data for the aggregate object includes valid data for the small object, then the method 400 proceeds to 440, otherwise the method 400 ends.

As represented by block 440, in various implementations, the method 400 includes recovering the small object based on the parity data associated with the aggregate object and/or the remaining object data associated with the aggregate object. The method 400 utilizes any suitable technique for recovering the small object based on the parity data. In various implementations, recovering the small object includes rebuilding, reconstructing, restoring, and/or repairing the small object from the parity data.

Figure 4B:
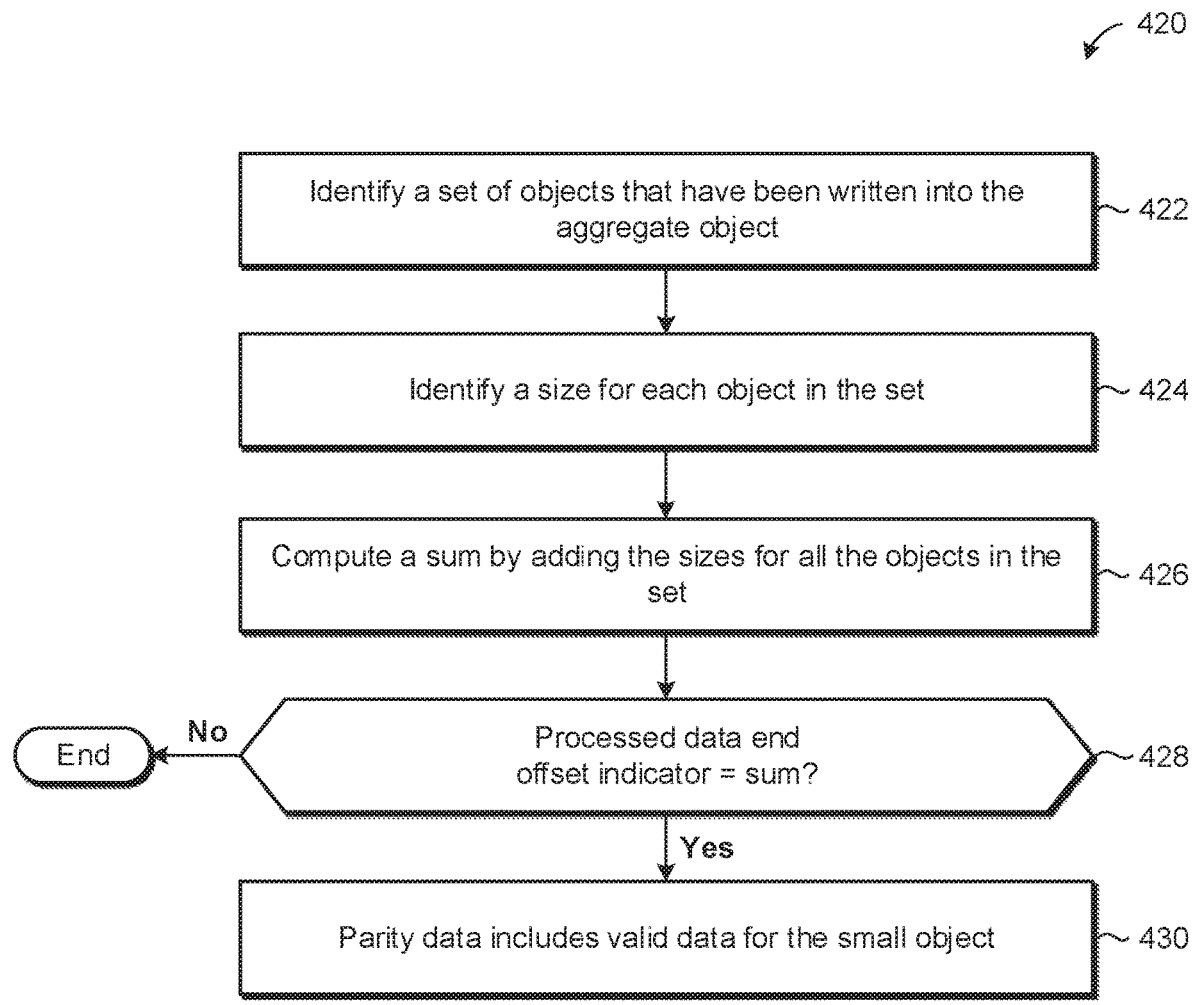
FIG. 4B is a flowchart representation of a method of determining whether the parity data associated with an aggregate object includes valid data for small objects in accordance with some implementations.

FIG. 4B is a flowchart representation of a method 420 of determining whether the parity data associated with an aggregate object includes valid data for a small object in accordance with some implementations. In various implementations, the method 420 is performed at block 420 shown in FIG. 4A. Briefly, the method 420 includes identifying the objects in the aggregate object (at block 422), determining a sum that represents the total size of the objects (at blocks 424 and 426), comparing the processed data end offset indicator with the sum (at block 428), and determining that the parity data includes valid data for the small object based on the comparison (at block 430).

As represented by block 422, in some implementations, the method 420 includes identifying a set of objects that have been written into the aggregate object. In various implementations, the method 420 includes accessing a database (e.g., the database 138 shown in FIG. 2) to identify the set of objects that have been written into the aggregate object. In some implementations, the set of objects includes the object that is being recovered and the objects that were written into the aggregate object prior to the object that is being recovered. In other words, in some implementations, the set of objects does not include objects that were written into the aggregate object after the object that is being recovered was written into the aggregate object.

In various implementations, the method 420 includes identifying a size for each object that is in the set (at block 424). In various implementations, the method 420 includes retrieving the size for each object from the database. As represented by block 426, in various implementations, the method 420 includes computing a sum by adding the sizes for all the objects in the set.

As represented by block 428, in various implementations, the method 420 includes determining whether the processed data end offset indicator is equal to the sum. In some implementations, if the processed data end offset indicator is not equal to the sum, then the method 420 ends. However, in some implementations, if the processed data end offset indicator is equal to the sum, then the method 420 proceeds to block 430. As represented by block 430, in various implementations, the method 420 includes determining that the parity data for the aggregate object includes valid data for the small object. Hence, the parity data for the aggregate object is usable for recovering the small object (e.g., as described in relation to block 440 in FIG. 4A).

Figure 5A:
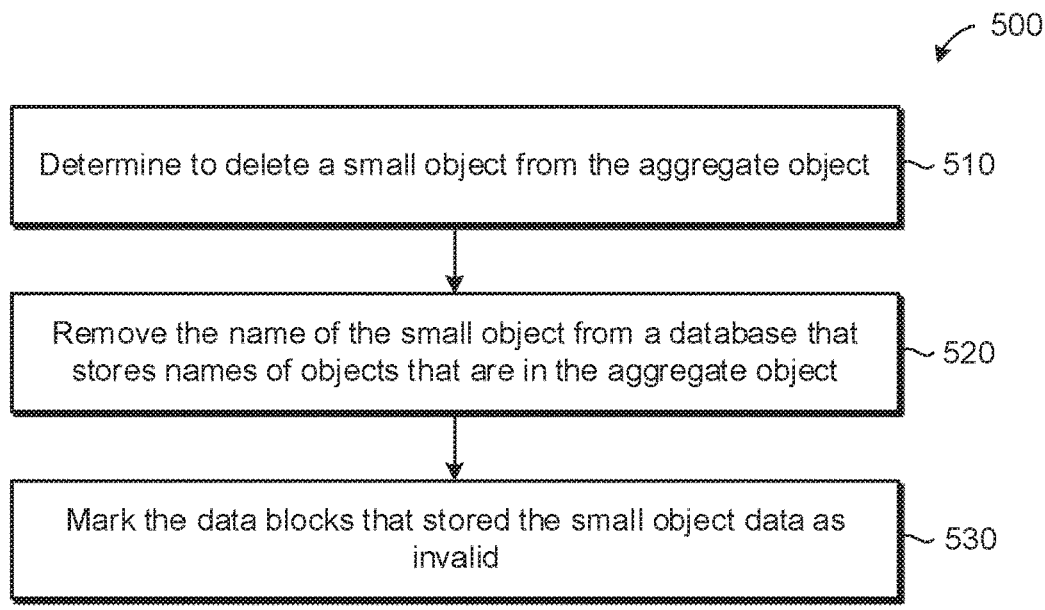
FIG. 5A is a flowchart representation of a method of deleting small objects from the enterprise storage system in accordance with some implementations.

FIG. 5A is a flowchart representation of a method 500 of deleting small objects from the storage system in accordance with some implementations. In various implementations, the method 500 is implemented as a set of computer readable instructions that are executable at the storage system. For example, in various implementations, the method 500 is performed by the deletion module 136 shown in FIG. 2. Briefly, the method 500 includes determining to delete a small object from an aggregate object (at block 510), removing the name of the small object from a database (at block 520), and marking the data blocks that stored the object data for the small object as invalid (at block 530).

As represented by block 510, in various implementations, the method 500 includes determining to delete a small object from an aggregate object that stores the small object. In various implementations, the method 500 includes receiving a delete request from a client device to delete a particular small object. In some implementations, the delete request specifies the name of the small object that is to be deleted from the storage system. In some implementations, the method 500 determines to a delete a small object based on an age of the small object. In some implementations, the method 500 determines to delete a small object based on a usage of the small object. For example, the method 500 determines to delete a small object that has not been requested by a client device for a threshold amount of time. In some implementations, the method 500 determines to delete a small object based on a size of the aggregate object (e.g., if the size of the aggregate object exceeds a threshold size).

As represented by block 520, in various implementations, the method 500 includes removing the name of the small object from a database (e.g., the database 138 shown in FIG. 2). In some implementations, the database stores the names of all objects that have been written into the aggregate object. In various implementations, the method 500 includes marking the data blocks that stored the small object as invalid, as represented by block 530. Since the name of the small object has been removed from the database and the data blocks corresponding with the small object have been marked as invalid, the small object is no longer accessible by a client device. As such, in some implementations, if a client device requests the small object, the storage system returns null.

Figure 5B:
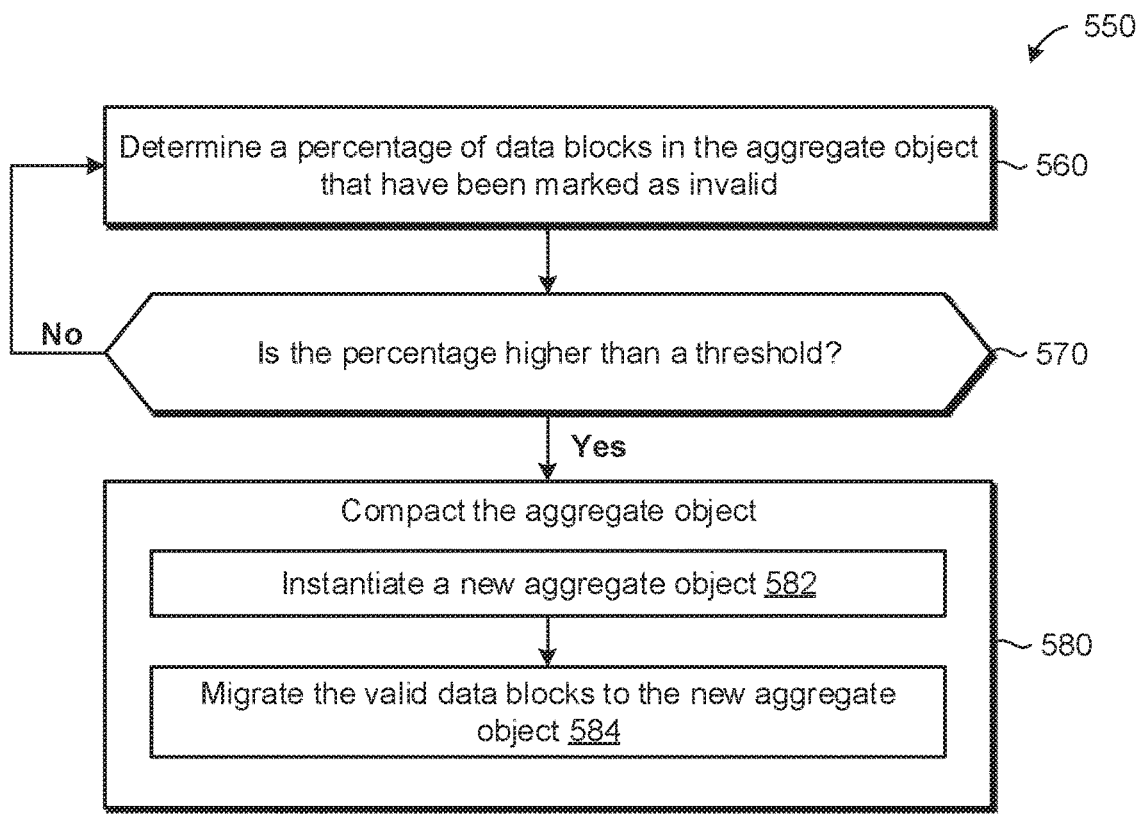
FIG. 5B is a flowchart representation of a method of compacting an aggregate object in accordance with some implementations.

FIG. 5B is a flowchart representation of a method 550 of compacting an aggregate object in accordance with some implementations. In various implementations, the method 550 is implemented as a set of computer readable instructions that are executable at the storage system. For example, in various implementations, the method 550 is performed by the compaction module 137 shown in FIG. 2. Briefly, the method 550 includes determining a percentage or a number of data blocks that have been marked as invalid (at block 560), determining whether the percentage or number is higher than a threshold (at block 570), and compacting the aggregate object based on the determination (at block 580).

As represented by block 560, in some implementations, the method 550 includes determining a percentage of data blocks in the aggregate object that have been marked as invalid. In various implementations, the method 550 includes counting the number of invalid data blocks, and dividing the number of invalid data blocks by the total number of data blocks to determine the percentage. In various implementations, the method 550 includes determining whether the percentage is higher than a threshold, as represented by block 570. In some implementations, the threshold is a constant that is configurable by an administrator of the storage system (e.g., via an administrator console). In some examples, the threshold ranges from 25% to 50%. If the percentage is lower than the threshold, then the method 550 includes waiting until the percentage is higher than the threshold. However, if the percentage is higher than the threshold, then the method 550 proceeds to block 580.

In various implementations, the method 550 includes compacting the aggregate object, as represented by block 580. In some implementations, compacting the aggregate object includes instantiating a new aggregate object (as represented by block 582), and migrating the valid data blocks to the new aggregate object (as represented by block 584). In some implementations, instantiating a new aggregate object refers to creating a new aggregate object. In some implementations, migrating the valid data blocks refers to copying the data stored in the valid data blocks from the old aggregate object to the new aggregate object. In various implementations, when the valid data blocks have been migrated to the new aggregated object, the method 550 includes purging the old aggregate object.

More generally, in some implementations, the method 550 includes determining a level of sparsity for the aggregate object. In some implementations, the percentage of invalid data blocks indicates the level of sparsity. In some implementations, if the level of sparsity exceeds a threshold, then the method 550 includes compacting the aggregate object (as represented by block 580). However, in some implementations, if the level of sparsity is below the threshold, the method 550 includes delaying the compaction until the level of sparsity exceeds the threshold.

Figure 6:
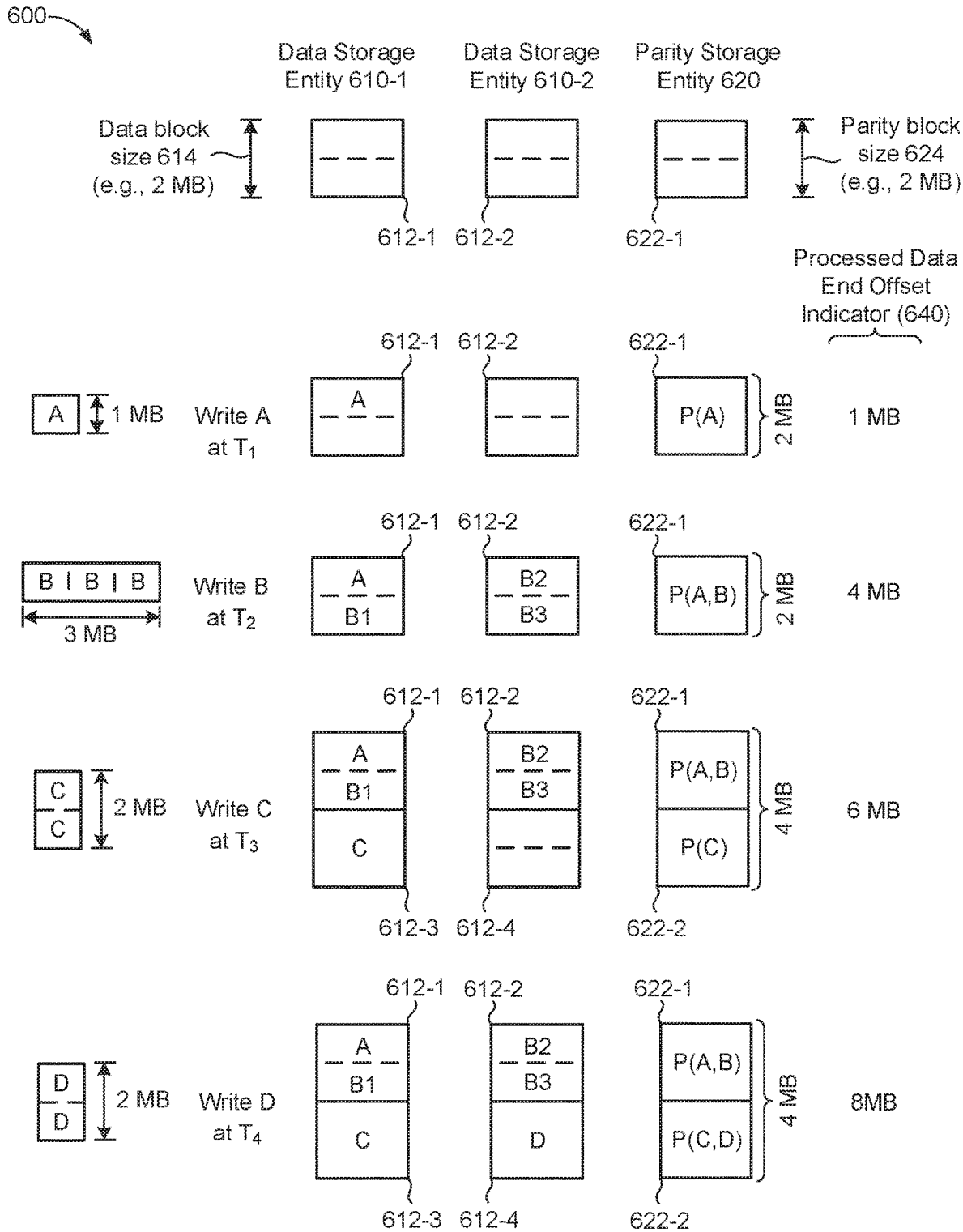
FIG. 6 is a diagram that illustrates small objects being written into the enterprise storage system in accordance with some implementations.

FIG. 6 is a diagram that illustrates small objects being written into a storage system 600 in accordance with some implementations. In various implementations, the storage system 600 is similar to the storage system 100 exemplified in FIGS. 1 and 2. For example, in various implementations, the storage system 600 includes a first data storage entity 610-1, a second data storage entity 610-2, and a parity storage entity 620. In some implementations, the data storage entities 610 include data blocks 612 of a particular data block size 614. In the example of FIG. 6, the data block size 614 is 2 MB. Similarly, in some implementations, the parity storage entity 620 includes parity blocks 622 of a particular parity block size 624. In the example of FIG. 6, the parity block size 624 is 2 MB. In the example of FIG. 6, the data block size 614 and the parity block size 624 are equal. However, in some implementations, the data block size 614 and the parity block size 624 are different.

As illustrated in FIG. 6, at time $T_1$, the storage system 600 determines to write object A. For example, in some implementations, the storage system 600 receives a request from a client device to store object A. In the example of FIG. 6, object A has a size of 1 MB. Object A qualifies as the small object 150 shown in FIGS. 1 and 2, for example, because the size of object A is less than the data block size 614. In some implementations, the storage system 600 writes object A into the first data block 612-1. Since the size of object A is half the data block size 614, object A only occupies half of the first data block 612-1.

In various implementations, the storage system 600 synthesizes parity data for object A, and writes the parity data into the first parity block 622-1. As illustrated in FIG. 6, in various implementations, the size of object A is 1 MB, and the parity data for object A occupies 1 MB of storage space available in the first parity block 622-1. In various implementations, upon storing the parity data for object A, the storage system 600 updates a value of a processed data end offset indicator 640. In some implementations, the storage system 600 increments the value of the processed data end offset indicator 640 by the size of object A. Hence, in the example of FIG. 6, the storage system 600 sets the value of the processed data end offset indicator 600 to 1 MB.

At time $T_2$, the storage system 600 determines to write object B. In the example of FIG. 6, object B has a size of 3 MB. Object B qualifies as the small object shown in FIGS. 1 and 2, for example, because the size of object B is of the same order of magnitude as the data block size 614. In some implementations, the storage system 600 writes 1 MB of object B into the first data block 612-1, and the remaining 2 MB of object B into the second data block 612-2. In various implementations, the storage system 600 synthesizes parity data for object B, and writes the parity data for object B in the first parity block 622-1. At time $T_2$, the first parity block 622-1 includes parity data for object A and object B. The storage system 600 increments the processed data end offset indicator 640 by the size of object B. Hence, after writing the parity data for object B, the processed data end offset indicator 640 is set to 4 MB.

At time $T_3$, the storage system 600 determines to write object C. In the example of FIG. 6, object C has a size of 2 MB. In some implementations, the storage system 600 writes object C into the third data block 612-3. Moreover, in various implementations, the storage system 600 synthesizes the parity data for object C, and writes the parity data into the second parity block 622-2. Furthermore, in some implementations, the storage system 600 increments the processed data end offset indicator 640 by the size of object C. Hence, after writing the parity data for object C, the processed data end offset indicator 640 is set to 6 MB. As indicated by the processed data end offset indicator 640, at time $T_3$, the storage system 600 stores 6 MB of object data but only 4 MB of parity data.

At time $T_4$, the storage system 600 determines to write object D. In the example of FIG. 6, object D has a size of 2 MB. In some implementations, the storage system 600 writes object D into the fourth data block 612-4. In various implementations, the storage system 600 synthesizes parity data for object D, and writes the parity data into the second parity block 622-2. Furthermore, the storage system 600 increments the processed data end offset indicator 640 by the size of object D. Hence, after writing the parity data for object D, the processed data end offset indicator 640 is set to 8 MB. As exemplified, after writing the parity data for object D, the storage system 600 stores 8 MB of object data and 4 MB of parity data.

In the example of FIG. 6, the amount of parity data remains constant at 4 MB at times $T_3$ and $T_4$. In other words, the amount of parity data remains constant at 4 MB immediately before and immediately after object D is written into the storage system 600. Hence, in some implementations, without the processed data end offset indicator 640, the storage system 600 is unable to determine whether the parity data stored in the second parity block 622-2 includes valid data for object D. However, in various implementations, the storage system 640 determines whether the second parity block 622-2 includes valid data for object D based on the value of the processed data end offset indicator 640. In the example of FIG. 6, if the value of the processed data end offset indicator 640 is 6 MB, then the storage system 600 determines that the second parity block 622-2 includes valid data for object C but not object D. However, if the value of the processed data end offset indicator 640 is 8 MB, then the storage system 600 determines that the second parity block 622-2 includes valid data for object C and object D. Hence, in the example of FIG. 6, if the value of the processed data end offset indicator 640 is 8 MB, the storage system 600 is able to recover object D upon detecting a loss of data at the fourth data block 612-4.

Figure 7:
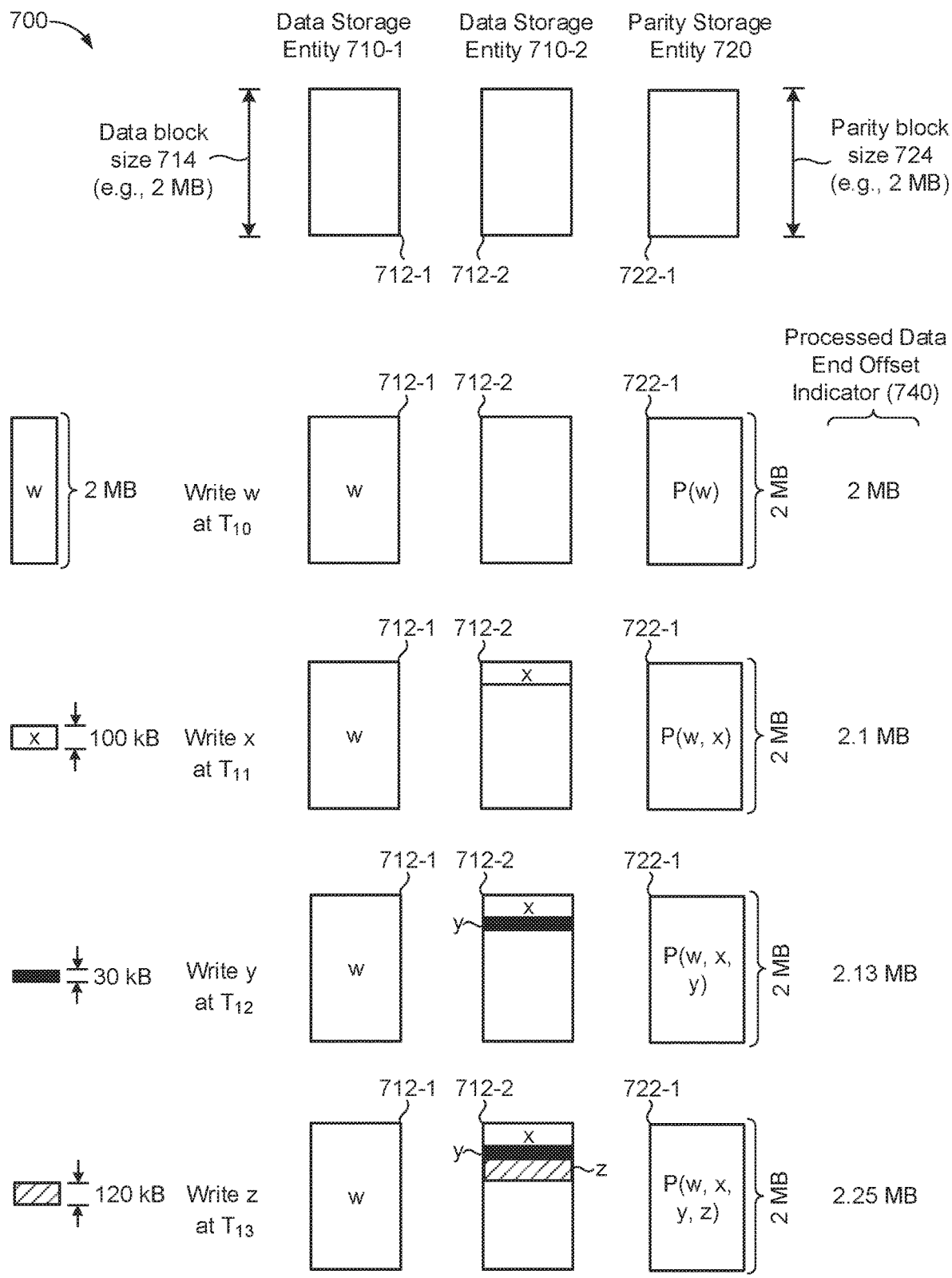
FIG. 7 is another diagram that illustrates small objects being written into the enterprise storage system in accordance with some implementations.

FIG. 7 is a diagram that illustrates small objects being written into a storage system 700 in accordance with some implementations. In various implementations, the storage system 700 is similar to the storage system 100 exemplified in FIGS. 1 and 2. For example, in various implementations, the storage system 700 includes a first data storage entity 710-1, a second data storage entity 710-2, and a parity storage entity 720. In some implementations, the data storage entities 710 include data blocks 712 of a particular data block size 714. In the example of FIG. 7, the data block size 714 is 2 MB. Similarly, in various implementations, the parity storage entity 720 includes parity blocks 722 of a particular parity block size 724. In the example of FIG. 7, the parity block size 724 is 2 MB. In the example of FIG. 7, the data block size 714 and the parity block size 724 are equal. However, in some implementations, the data block size 714 and the parity block size 724 are different.

At time $T_{10}$, the storage system 700 determines to write object w. For example, in some implementations, the storage system 700 receives a request from a client device to store object w. In the example of FIG. 7, object w has a size of 2 MB. Object w qualifies as the small object 150 shown in FIGS. 1 and 2, for example, because the size of object w is of the same order of magnitude as the data block size 714. In various implementations, the storage system 700 writes object w into the first data block 712-1. Since the size of object w is equal to the data block size 714, object w occupies the entire first data block 712-1.

In various implementations, the storage system 700 synthesizes parity data for object w, and writes the parity data into the first parity block 722-1. As illustrated in FIG. 7, the size of object w is 2 MB, and the parity data for object w occupies the entire 2 MB of storage space available in the first parity block 722-1. Upon storing the parity data for object w, the storage system 700 updates a value of a processed data end offset indicator 740. In some implementations, the storage system 700 increments the value of the processed data end offset indicator 740 by the size of object w. Hence, in the example of FIG. 7, the storage system 700 increases the value of the processed data end offset indicator 700 by 2 MB.

At time $T_{11}$, the storage system 700 determines to write object x. For example, in some implementations, the storage system 700 receives a request from a client device to store object x. In the example of FIG. 7, object x has a size of 100 kB. Object x qualifies as the small object 150 shown in FIGS. 1 and 2, for example, because the size of object x is less than the data block size 714. In various implementations, the storage system 700 writes object x into the second data block 712-2 since the first data block 712-1 is full. Since the size of object x is much smaller than the data block size 714, object x occupies only a portion of the second data block 712-2.

In various implementations, the storage system 700 synthesizes parity data for object x, and writes the parity data into the first parity block 722-1. As illustrated in FIG. 7, although the collective size of objects w and x is 2.1 MB, in some implementations, the parity data for objects w and x only occupies 2 MB of storage space. Upon storing the parity data for object x, the storage system 700 updates a value of a processed data end offset indicator 740. In some implementations, the storage system 700 increments the value of the processed data end offset indicator 740 by the size of object x. Hence, in the example of FIG. 7, the storage system 700 increases the value of the processed data end offset indicator 700 by 100 kB.

At time $T_{12}$, the storage system 700 determines to write object y. In the example of FIG. 7, object y has a size of 30 kB. Similar to object x, object y also qualifies as the small object 150 shown in FIGS. 1 and 2, for example, because the size of object y is less than the data block size 714. The storage system 700 writes object y into the second data block 712-2. The storage system 700 synthesizes parity data for object y, and writes the parity data for object y in the first parity block 722-1. Hence, at time $T_{12}$, the first parity block 722-1 includes parity data for objects w, x and y. The storage system 700 increments the processed data end offset indicator 740 by the size of object y. Hence, in this example, after writing the parity data for object y, the processed data end offset indicator 740 is set to 2.13 MB.

At time $T_{13}$, the storage system 700 determines to write object z. In the example of FIG. 7, object z has a size of 120 kB. The storage system 700 writes object z into the second data block 712-2. Moreover, the storage system 700 synthesizes the parity data for object z, and writes the parity data into the first parity block 722-1. Furthermore, the storage system 700 increments the processed data end offset indicator 740 by the size of object z. Hence, after writing the parity data for object z, the processed data end offset indicator 740 is set to 2.25 MB. It is worth noting that, as indicated by the processed data end offset indicator 740, the storage system 700 stores 2.25 MB of object data but only 2 MB of parity data.

In the example of FIG. 7, the amount of parity data remains constant at 2 MB at times $T_{11}$ and $T_{12}$. In other words, the amount of parity data remains constant at 2 MB immediately before and immediately after object y is written into the storage system 700. Hence, in various implementations, without the processed data end offset indicator 740, the storage system 700 is unable to determine whether the parity data stored in first parity block 722-1 includes valid data for object y. However, in various implementations, the storage system 740 determines whether the first parity block 722-1 includes valid data for object y based on the value of the processed data end offset indicator 740. In the example of FIG. 7, if the value of the processed data end offset indicator 740 is 2.1 MB, then the storage system 700 determines that the first parity block 722-1 includes valid data for objects w and x, but not object y. However, if the value of the processed data end offset indicator 740 is 2.13 MB, then the storage system 700 determines that the first parity block 722-1 includes valid data for objects w, x and y. Hence, in this example, if the value of the processed data end offset indicator 740 is 2.13 MB, the storage system 700 is able to recover object y upon detecting a loss of data at the second data block 712-2.

Similarly, the amount of parity data remains constant at 2 MB at times $T_{12}$ and $T_{13}$. In other words, the amount of parity data remains constant at 2 MB immediately before and immediately after object z is written into the storage system 700. Hence, without the processed data end offset indicator 740, in some implementations, the storage system 700 is unable to determine whether the parity data stored in first parity block 722-1 includes valid data for object z. However, in various implementations, the storage system 740 determines whether the first parity block 722-1 includes valid data for object z based on the value of the processed data end offset indicator 740. In the example of FIG. 7, if the value of the processed data end offset indicator 740 is 2.13 MB, then the storage system 700 determines that the first parity block 722-1 includes valid data for objects w, x and y, but not object z. However, if the value of the processed data end offset indicator 740 is 2.25 MB, then the storage system 700 determines that the first parity block 722-1 includes valid data for objects w, x, y and z. Hence, in this example, if the value of the processed data end offset indicator 740 is 2.25 MB, the storage system 700 is able to recover object z upon detecting a loss of data at the second data block 712-2.

Figure 8:
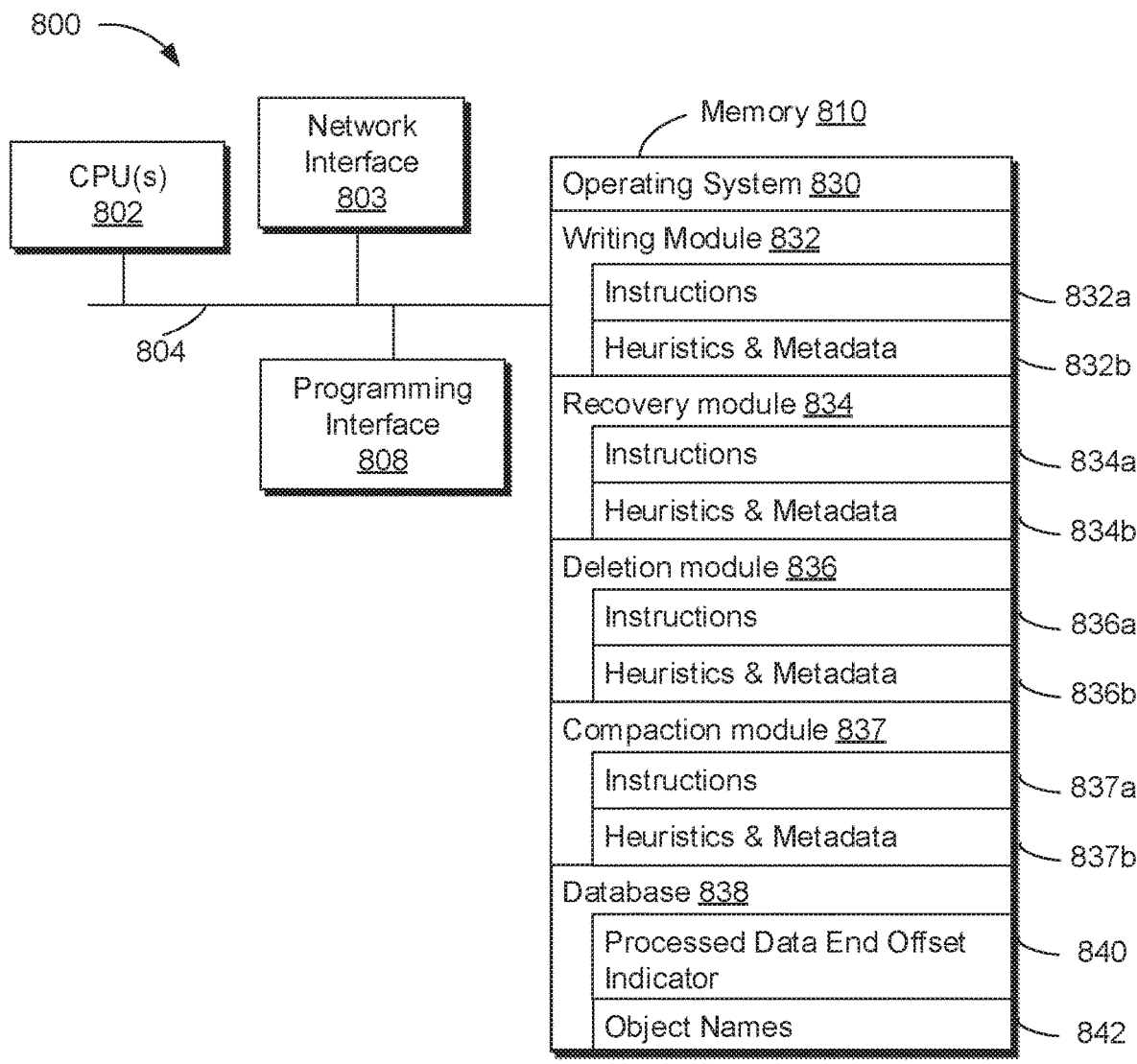
FIG. 8 is a block diagram of a server system enabled with various modules that facilitate the writing, recovering, and/or deleting of small objects in accordance with some implementations.

FIG. 8 is a block diagram of a server system 800 enabled with one or more components of a storage system (e.g., the storage system 100 shown in FIGS. 1 and 2) according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 800 includes one or more processing units (CPUs) 802, a network interface 803, a memory 810, a programming interface 808, and one or more communication buses 804 for interconnecting these and various other components.

In some implementations, the network interface 803 is provided to, among other uses, establish and maintain a metadata tunnel between a cloud hosted network management system and at least one private network including one or more compliant devices. In some implementations, the communication buses 804 include circuitry that interconnects and controls communications between system components. The memory 810 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 810 optionally includes one or more storage devices remotely located from the CPU(s) 802. The memory 810 comprises a non-transitory computer readable storage medium.

In some implementations, the memory 810 or the non-transitory computer readable storage medium of the memory 810 stores the following programs, modules and data structures, or a subset thereof including an optional operating system 830, a writing module 832, a recovery module 834, a deletion module 836, a compaction module 837, and a database 838. In various implementations, the writing module 832, the recovery module 834, the deletion module 836, the compaction module 837, and the database 838 are similar to the writing module 132, the recovery module 134, the deletion module 136, the compaction module 137 and the database 138, respectively shown in FIG. 2. In various implementations, the database 838 stores a processed data end offset indicator 840 (e.g., the processed data end offset indicator 140 shown in FIG. 1), and object names 842 (e.g., the object names 142 shown in FIG. 1).

The operating system 830 includes procedures for handling various basic system services and for performing hardware dependent tasks.

In some implementations, the writing module 832 is configured to write a small object into an aggregate object. For example, as illustrated in FIGS. 1 and 2, the writing module 832 writes the small object 150 into the aggregate object 170. In various implementations, the writing module 832 also synthesizes parity data for the small object, and writes the parity data into parity blocks associated with the aggregate object. Upon writing the parity data for the small object, the writing module 832 updates the processed data end offset indicator 840. For example, in various implementations, the writing module 832 increments the processed data end offset indicator 840 by a size of the small object. In some implementations, the writing module 832 performs the method 300 illustrated in FIG. 3A, and/or the method 300a illustrated in FIG. 3B. To that end, in various implementations, the writing module 832 includes instructions and/or logic 832a, and heuristics and metadata 832b.

In various implementations, the recovery module 834 is configured to recover small objects (e.g., the small object 150 shown in FIGS. 1 and 2). In some implementations, the recovery module 834 detects that at least a portion of the object data associated with the small object has been lost. In some implementations, the recovery module 834 recovers the small object based on the remaining object data and/or the parity data associated with the small object. In various implementations, the recovery module 834 recovers the small object based on the parity data, if the processed data end offset indicator 840 indicates that the parity data for the aggregate object includes valid data for the small object. For example, in some implementations, the recovery module 834 performs the method 400 illustrated in FIG. 4A, and/or the method 420 illustrated in FIG. 4B. To that end, in various implementations, the recovery module 834 includes instructions and/or logic 834a, and heuristics and metadata 834b.

In various implementations, the deletion module 836 is configured to delete an object (e.g., a small object) from the storage system (e.g., the aggregate object). In some implementations, the deletion module 836 removes the name of the object from the database 838, and marks the data blocks associated with the object as invalid. The deletion module 836 uses any suitable techniques(s) to mark the data blocks as invalid. In some implementations, the deletion module 836 performs the method 500 illustrated in FIG. 5A. To that end, in various implementations, the deletion module 836 includes instructions and/or logic 836a, and heuristics and metadata 836b.

In various implementations, the compaction module 837 is configured to perform a compaction of the aggregate object. In some implementations, the compaction module 837 performs the compaction when the number/percentage of invalid data blocks exceeds a threshold. More generally, in some implementations, the compaction module 837 compacts the aggregate object when the aggregate object appears sparse. For example, in some implementations, the compaction module 837 compacts the aggregate object when a level of sparsity of the aggregate object is greater than a threshold. In some implementations, the compaction module 837 performs the compaction of the aggregate object by instantiating a new aggregate object, and migrating the valid data blocks from the aggregate object to the new aggregate object. In various implementations, the compaction module 837 performs the method 550 illustrated in FIG. 5B. To that end, in various implementations, the compaction module 837 includes instructions and/or logic 837a, and heuristics and metadata 837b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a fault-tolerant enterprise object storage system configured to synthesize parity data in order to protect stored data from loss, the fault-tolerant enterprise object storage system including a plurality of storage entities each configured to store data on a block basis and one or more processors:
      writing a first object into an aggregate object that is distributed across the plurality of storage entities, wherein a first size of the first object is at least an order of magnitude less than a second size of the aggregate object and within the same order of magnitude of a block unit addressable within each of the storage entities, and the first object partially occupies a first block unit;
      synthesizing parity data for the first object;
      writing the parity data for the first object into parity data associated with the aggregate object in response to writing the first object into the aggregate object, wherein the parity data associated with the aggregate object is stored at one or more parity storage entities; and
      updating a processed data end offset indicator by incrementing a value of the processed data end offset indicator by the first size, wherein the processed data end offset indicator indicates that the parity data for the aggregate object includes valid data up to and including the first object that partially occupies the first block unit, and a value of the processed data end offset indicator indicates an amount of the valid data in the aggregate object.

2. The method of claim 1, wherein writing the first object into the aggregate object comprises:
   receiving a request to store the first object in the fault-tolerant enterprise object storage system; and writing the first object into data blocks associated with the aggregate object.

3. The method of claim 1, wherein writing the parity data for the first object into the parity data associated with the aggregate object comprises:
writing the parity data for the first object into storage space available in a first parity block.

4. The method of claim 3, wherein updating the processed data end offset indicator comprises:
determining the first size of the first object; and
incrementing the value of the processed data end offset indicator by the first size includes maintaining an amount of parity data while incrementing the value of the processed data end offset indicator when the storage space is available in the first parity block.

5. The method of claim 1, further comprising:
transmitting a message indicating that the first object has been written into the fault-tolerant enterprise object storage system.

6. The method of claim 1, further comprising:
detecting a loss of data at one of the storage entities that stored the first object;
determining, based on the processed data end offset indicator, whether the parity data associated with the aggregate object includes valid data for the first object; and
upon determining that the parity data includes valid data for the first object, recovering the first object based on the parity data.

7. The method of claim 6, wherein determining whether the parity data includes valid data for the first object comprises:
identifying a set of objects that have been written into the aggregate object, wherein the set includes the first object;
identifying a size for each object in the set;
computing a sum by adding the sizes for all the objects in the set; and
determining that the parity data includes valid data for the first object when the value of the processed data end offset indicator is equal to the sum.

8. The method of claim 7, wherein identifying the set of objects comprises:
identifying the objects that were written into the aggregate object prior to the first object was written into the aggregate object.

9. The method of claim 1, further comprising:
inserting a name of the first object in a database that stores names of objects that have been written into the aggregate object.

10. The method of claim 9, further comprising:
determining to delete the first object from the fault-tolerant enterprise object storage system;
removing the name of the first object from the database; and
marking data blocks that store the first object as invalid.

11. The method of claim 10, further comprising:
determining whether to compact the aggregate object; and
compacting the aggregate object based on the determination to compact the aggregate object.

12. The method of claim 11, wherein determining whether to compact the aggregate object comprises:
determining a percentage of data blocks in the aggregate object that have been marked as invalid;
determining whether the percentage is higher than a threshold; and
determining to compact the aggregate object when the percentage is higher than the threshold.

13. The method of claim 11, wherein compacting the aggregate object comprises:
instantiating a second aggregate object; and
migrating valid data blocks of the aggregate object to the second aggregate object, wherein valid data blocks are data blocks that have not been marked as invalid.

14. A fault-tolerant enterprise object storage system comprising:
a plurality of data storage entities, each data storage entity comprises a plurality of data blocks for storing object data, wherein each data block is associated with a block size;
one or more parity storage entities that comprises a plurality of parity blocks for storing parity data; and
an ingest entity configured to:
write a first object into an aggregate object that is distributed across the plurality of data storage entities, wherein a first size of the first object is at least an order of magnitude less than a second size of the aggregate object and within the same order of magnitude as the block size, and the first object partially occupies a first data block;
synthesize parity data for the first object;
write the parity data for the first object into parity data associated with the aggregate object in response to writing the first object into the aggregate object, wherein the parity data associated with the aggregate object is stored at one or more parity storage entities; and
update a processed data end offset indicator by incrementing a value of the processed data end offset indicator by the first size, wherein the processed data end offset indicator indicates that the parity data for the aggregate object includes valid data up to and including the first object that partially occupies the first block unit, and a value of the processed data end offset indicator indicates an amount of the valid data in the aggregate object.

15. The fault-tolerant enterprise object storage system of claim 14, wherein writing the first object into the aggregate object comprises:
receiving a request to store the first object in the fault-tolerant enterprise object storage system; and
writing the first object into the data blocks associated with the aggregate object.

16. The fault-tolerant enterprise object storage system of claim 14, wherein updating the parity data associated with the aggregate object comprises:
writing the parity data for the first object into storage space available in a first parity block.

17. The fault-tolerant enterprise object storage system of claim 16, wherein updating the processed data end offset indicator comprises:
determining the first size of the first object; and
incrementing the value of the processed data end offset indicator by the first size includes maintaining an amount of parity data while incrementing the value of the processed data end offset indicator when the storage space is available in the first parity block.

18. The fault-tolerant enterprise object storage system of claim 14, wherein the ingest entity is further configured to:
transmit a message indicating that the first object has been written into the fault-tolerant enterprise object storage system.

19. The fault-tolerant enterprise object storage system of claim 14, wherein the ingest entity is further configured to:
- detect a loss of data at one of the data storage entities that stored the first object;
- determine, based on the processed data end offset indicator, whether the parity data associated with the aggregate object includes valid data for the first object; and
- upon determining that the parity data includes valid data for the first object, recover the first object based on the parity data.

20. A device comprising:
- a processor configured to execute computer readable instructions included on a non-transitory memory; and
- a non-transitory memory including computer readable instructions, that when executed by the processor, cause the device to:
  - write a first object into an aggregate object that is distributed across a plurality of storage entities, wherein a first size of the first object is at least an order of magnitude less than a second size of the aggregate object and within the same order of magnitude of a block unit addressable within each of the storage entities, and the first object partially occupies a first block unit;
  - synthesize parity data for the first object;
  - write the parity data for the first object into parity data associated with the aggregate object in response to writing the first object into the aggregate object, wherein the parity data associated with the aggregate object is stored at one or more parity storage entities; and
  - update a processed data end offset indicator that indicates by incrementing a value of the processed data end offset indicator by the first size, wherein the processed data end offset indicator indicates that the parity data for the aggregate object includes valid data up to and including the first object that partially occupies the first block unit, and a value of the processed data end offset indicator indicates an amount of the valid data in the aggregate object.

* * * * *